(12) United States Patent
Kong et al.

(10) Patent No.: US 7,709,094 B2
(45) Date of Patent: May 4, 2010

(54) CO-EXTRUDED WATER-PROOF AND MOISTURE-PERMEABLE FILM STRUCTURE AND TEXTILE

(75) Inventors: Dan-Cheng Kong, Hsinchu (TW); Ruei-Shin Chen, Changhua County (TW); Yih-Her Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 12/035,311

(22) Filed: Feb. 21, 2008

(65) Prior Publication Data

US 2009/0093179 A1   Apr. 9, 2009

(30) Foreign Application Priority Data

Oct. 5, 2007   (TW) .............................. 96137422 A

(51) Int. Cl.
*B32B 27/00* (2006.01)
*B32B 27/40* (2006.01)

(52) U.S. Cl. .................. 428/423.3; 428/424.2; 442/290; 442/398

(58) Field of Classification Search .............. 428/423.3, 428/424.2; 442/290, 398
See application file for complete search history.

(56) References Cited

U.S. PATENT DOCUMENTS 5,254,641 A   10/1993   Alex et al.
5,283,112 A   2/1994   Krishnan
6,524,712 B1 *   2/2003   Schledjewski et al. ... 428/423.1
6,607,831 B2 *   8/2003   Ho et al. .................. 428/423.1
6,790,926 B1   9/2004   Spijkers et al.
2003/0195293 A1   10/2003   Lubnin et al.
2004/0091693 A1 *   5/2004   Thomas et al. ........... 428/317.9
2004/0092696 A1   5/2004   Vedula et al.

FOREIGN PATENT DOCUMENTS

| DE | 4339475 | 5/1995 |
|---|---|---|
| DE | 4442380 | 5/1996 |
| EP | 335276 | 10/1989 |
| GB | 2087909 | 6/1982 |
| GB | 2157703 | 10/1985 |
| JP | 2000-220076 | 8/2000 |
| TW | 200724577 | 7/2007 |
| WO | WO 9000180 | 1/1990 |
| WO | WO 9000969 | 2/1990 |

* cited by examiner

*Primary Examiner*—Norca L Torres-Velazquez
(74) *Attorney, Agent, or Firm*—Quintero Law Office

(57) ABSTRACT

Disclosed is a co-extruded water-proof and moisture-permeable film structure, including a top skin layer, a core layer, and a bottom skin layer. The top and bottom skin layers include polyolefin or polyurethane and the core layer comprise polyurethane. The core layer is disposed between the top and bottom skin layers. If polyurethane is adopted in top and/or bottom skin layers, the polyurethane of the skin layers has lower moisture and vapor permeability than the polyurethane of the core layer. The described film can be manufactured by co-extruded bubble blown or co-extruded casting. In addition, the film can be laminated to a fabric to form a waterproof and moisture-permeable textile.

14 Claims, 1 Drawing Sheet

CO-EXTRUDED WATER-PROOF AND MOISTURE-PERMEABLE FILM STRUCTURE AND TEXTILE

BACKGROUND OF THE INVENTION

1. Field of the Invention

The present invention relates to a polymer material, and in particular relates to a co-extruded water-proof and moisture-permeable film and a textile including the same.

2. Description of the Related Art

Thermoplastic polyurethane (TPU) is a soft elastomeric resin with high tensile strength, wearproof, low temperature resistance, and strong adhesion. The polyurethane, meets environmental requirements due to its decomposability, with no use of solvents during processing, and has been widely been applied in textiles and ready-made clothes. In film processing, a thin (<20 μm) and uniform (±15%) film can be obtained using a blown film method.

When polyurethane film is rolled or pulled, film blocking may easily occur due to high surface friction force thereof, resulting in film breakage. Conventional additives methods are employed to solve the problem. The quantity of additives, however, is large, increasing costs. Also, die-build-up may occur during fabrication due to water absorption of the polyurethane.

Thus, development of a water-vapor permeable film fabrication method which prevents film blocking and die-build-up is desirable.

Current water-vapor permeable polyurethane fabrication methods mainly comprise adding hydrophilic functional groups to a polymer structure. Other accessory methods such as adding absorbent powders, creating pores, forming cross-linking structure, or adding aromatic compounds also increase water-vapor permeability or film strength. There are many patents related to water-vapor permeable polyurethane, mainly comprising use of additives or film modification by back-end processing. Few, however, relate to film composition.

U.S. Pat. No. 6,790,926 discloses a water vapor permeable polyurethane, and fabrication and application thereof. The polyurethane comprises a polyether-polyol containing high weight percentage of ethylene oxide (comprising polyethylene glycol (PEG) and 4,4-methylene bisphenyl diisocyanate (MDI)), a small molecule chain extender, and an araliphatic diol. Addition of the araliphatic diol containing benzene structure increases resin strength and reduces adhesion between films.

U.S. Pat. No. 2004/092,696 discloses a polyurethane comprising a polyether intermediate containing ethylene oxide (containing two terminal hydroxyl functional groups) and a chain extender such as araliphatic diol. The polyurethane provides high melting temperature, high tensile strength, and anti-static electricity. This patent also discloses a textile combined with the polyurethane, capable of elongation, high water vapor permeability, thermal resistance, and processability.

US 2003/195,293 discloses an aqueous and water vapor permeable polyurethane comprising a polyol containing ethylene oxide. No emulsifying agent or amine neutralizer is required during water dispersion due to formation of the hydrophilic ethylene oxide chains, preventing pollution from solvents or small molecule vaporized substances. Wound dressing materials or textiles combined therewith also provide high water vapor permeability. Additionally, film strength is improved by addition of other polymer materials.

JP 2000/220,076 discloses a solvent-based polyurethane containing at least 20 wt % ethylene oxide. To avoid over-concentration of ethylene oxide in soft segment, a diol chain extender containing ethylene oxide is further added to increase ethylene oxide content in hard segment. Thus, water vapor permeable groups are uniformly distributed in the polyurethane, increasing film strength.

DE 4,442,380 discloses a polyurethane comprising one or more polyether polyurethanes, one of which is a water vapor permeable polyethylene glycol polyurethane, and other polyurethanes selected by strength requirements. Ethylene oxide content and mixing ratio among polyether polyurethanes are defined. Polyester polyurethanes, however, are not suitable for use in film fabrication due to lower water vapor permeability.

DE 4,339,475 discloses a polyurethane having 35~60 wt % ethylene oxide comprising polyether-polyol. To facilitate coating, melting viscosity less than 70 is required. The small molecule chain extender comprises ether-diol and ester-diol. Large molecule polyester-polyol, however, is not used.

U.S. Pat. No. 5,254,641 discloses a water vapor permeable polyurethane film comprising a polyurethane containing polyethylene glycol (PEG) with a hardness of 75 A~92 A and 5-20 wt % polyether-amide or polyether-ester. Film strength can be effectively improved by addition of the polyether-amide or polyether-ester.

U.S. Pat. No. 5,283,112 discloses a polyurethane comprising a hydrophilic polyethylene glycol (PEG) and a hydrophobic polydimethyl siloxane (PDMS). During fabrication, phase separation is more complete due to different hydrophilicity of components, resulting in a stronger film. Also, softness of polyurethane and its adhesion to substrates can be improved by addition of PDMS.

EP 335,276 discloses a water vapor permeable non-yellowing polyurethane comprising an aliphatic or cyclo-aliphatic diisocyanate, a polyether-polyol containing ethylene oxide, and a diol. The soft polyurethane having optimal physical modulus can be obtained, suitable for use in extrusion processing.

GB 2,087,909 discloses a solvent-based polyurethane. A short-chain diol is first mixed with exceeding diisocyanate to form a pre-polymer. Next, a polyethylene glycol (PEG) is added thereto. A polyurethane containing 25~40 wt % polyethylene glycol is thus formed. Film strength is improved by addition of the longer hard segment pre-polymer comprising the diol and diisocyante.

WO 9,000,969, WO 9,000,180, and GB 2,157,703 disclose a two-component or pre-polymer-type polyurethane comprising a polyether-polyol such as polyethylene glycol (PEG), a chain extender, and a cross-linking reagent. The resulting polyurethane has high NCO and provides low viscosity. Additionally, film strength is increased by formation of a cross-linking structure.

In Taiwan 200724577, the inventor of this invention discloses a water-vapor permeable film including polyurethane and polyethylene.

BRIEF SUMMARY OF THE INVENTION

The invention provides a co-extruded water-proof and moisture-permeable film structure, comprising a top skin layer comprising polyolefin or first polyurethane; a core layer comprising second polyurethane; and a bottom skin layer comprising polyolefin or third polyurethane; wherein the core layer is disposed between the top skin layer and the bottom skin layer; and the first and third polyurethane have lower moisture and vapor permeability than the second polyurethane.

The invention also provides a water-proof and moisture-permeable textile, comprising a fabric and the described film structure laminated onto the fabric with an adhesive.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
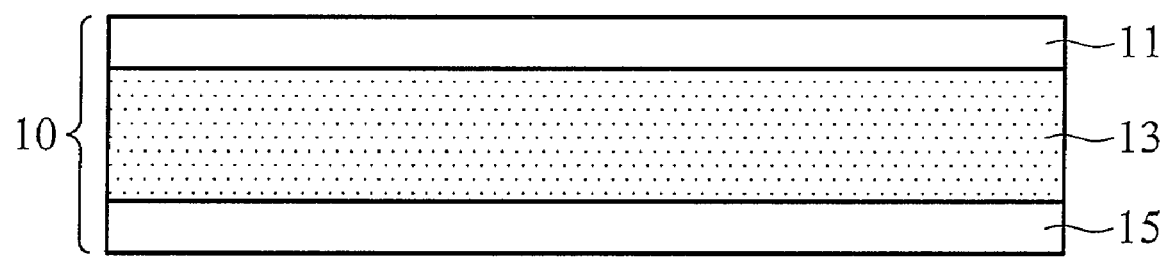
FIG. 1 is a diagram showing a co-extruded water-proof and moisture-permeable film structure of the invention.

The following description is of the best-contemplated mode of carrying out the invention. This description is made for the purpose of illustrating the general principles of the invention and should not be taken in a limiting sense. The scope of the invention is best determined by reference to the appended claims.

As shown in FIG. 1, the invention provides a water-proof and moisture-permeable film structure 10 including a top skin layer 11, core layer 13, and bottom skin layer 15. The top and bottom skin layers 11 and 15 include polyolefin or polyurethane, and the core layer 13 includes polyurethane. Compared to the polyurethane of the core layer 13, the polyurethane of the top and bottom skin layers 11 and 15 has lower moisture and vapor permeability. In one embodiment, the polyurethane is thermoplastic polyurethane composed of a hard segment and soft segment. The hard segment can be aromatic polyisocyanate such as toluene diisocyanate (TDI) or 4,4-methylene bisphenyl diisocyanate (MDI). The soft segment can be polyether-polyol, polyester polyol, or copolymers thereof. The polyether-polyol includes polyethylene glycol (PEG), polypropylene glycol (PPG), polytetramethylene glycol (PTMG), or poly(1,4-butane diol) (1,4-BD). The polyester-polyol can be poly(1,4-butylene adipate) (PBA). The described hard segment and soft segment have a molar ratio of about 0.3 to 0.8. In one embodiment, the molar ratio of the isocyanate group and the hydroxyl group in the polyurethane precursor should be 0.9 to 1.2.

Alternatively, the top and/or bottom skin layers 11 and 15 can be polyolefin. Suitable polyolefin includes polyethylene (PE), ethylene propylene copolymer, or ethylene propylene butylene terpolymer. The PE is classified to branched or linear, and the linear type includes linear low density PE (LLDPE, density is about 0.915 to 0.940 g/cm$^3$), and high density PE (HDPE, density is about 0.941 to 0.970 g/cm$^3$), or blends thereof.

In one embodiment, the core layer 13 has a thickness of about 5 to 100 μm. In one embodiment, the thickness of the core layer 13 is about 5 to 30 μm, or 10 to 20 μm. While the top and bottom skin layers 11 and 15 is polyolefin, they are far thinner than the core layer 13. In this condition, the top/bottom skin layers 11/15 and the core layer 13 have a thickness ratio of about 1/10 to 1/20. For example, the core layer 13 has a thickness of 20 μm, which means the top and bottom skin layers 11 and 15 have a thickness of about 1 to 2 μm. On the other hand, when the top and bottom skin layers 11 and 15 is polyolefin, their thickness is not limited. In practice, the top and bottom skin layers 11 and 15 are thicker or equal to the core layer 13 in thickness for simplifying the process. Note that the top skin layer 11 and the bottom skin layer can be same or different material. The co-extruded water-proof and moisture-permeable film structure can be arranged as below: polyolefin/polyurethane/polyolefin, polyurethane/polyurethane/polyurethane, or polyolefin/polyurethane/polyurethane. As described above, the polyurethane of the top and bottom skin layers 11 and 15 is different from the polyurethane of the core layer 13, and far thinner than the polyurethane of the core layer 13. Because top and bottom skin layers 11 and 15 have low water absorption and low surface friction, the problems such as film blocking and die-build-up in fabricating film structure 10 can be avoided to improve manufacturing yields. If the film structure 10 is manufactured by blown film method, the blow-up ratio thereof is about 1.5 to 3.0, and preferably 2.0. In addition, the cast film method and extrusion coating method are also suitable for manufacturing the film structure 10.

After completing the described film structure 10, the film structure can be laminated onto a fabric by an adhesive to form a textile. Thus, obtaining a water-proof and moisture-permeable textile. Note that if polyolefin is adopted as top and/or bottom skin layers 11 and 15, the polyolefin layer should be removed before laminating the film structure onto the fabric. For example, if the film structure 10 is polyurethane/polyurethane/polyurethane, no removal is needed before lamination. Alternatively, if the film structure 10 is polyolefin/polyurethane/polyolefin, the top and bottom skin layers should be removed before lamination. If one of the top and bottom skin layers 11 and 15 is polyolefin and the other is polyurethane, such as polyolefin/polyurethane/polyurethane, the top skin layer 11 of polyolefin is removed and the bottom skin layer 15 of polyurethane is retained before lamination.

The described fabric can be woven, knitted, non-woven, or other suitable formation. In one embodiment, the adhesive exhibits a non-continuous distribution to avoid reducing the moisture permeability of the textile. The textile is widely applied in clothes, the automobile industry, medical articles, sport articles, bedding, or the glass industry.

EXAMPLES AND COMPARATIVE EXAMPLES

Example 1

In Example 1, trilayered co-extruded water-proof and moisture-permeable film structure was fabricated by blown method. The top and bottom skin films were LDPE with a thickness of 20 μm (NA112-27, commercial available from USI corporation, Taiwan). The core layer was polyurethane including hard segment TDI and soft segment PEG with a molar ratio of 0.83:0.17 and a thickness of 20 μm (I-80M, synthesized by Industrial Technology Research Institute, Taiwan). The blow-up ratio was 2.0. Before measuring the water permeability of the film, the top and bottom skin films were stripped off. Therefore, only I-80 film was tested by ASTM-E96-BW and JIS-L-1099-A-2 as was tabulated in Table 1. ASTM-E96-BW is an inverted cup test for the water vapor permeability of a film. In the environment of 25° C. and relative humidity of 50%, the water cup was inverted to cover the film for measuring the water vapor permeability with unit of g/m²/24 hr. JIS-L-1099-A-2 is an upright cup test for the water vapor permeability of a film. In the environment of 40° C. and relative humidity of 50%, the film was covered on the water cup for measuring the water vapor permeability with unit of g/m²/24 hr. The higher measured value of the cup tests means higher vapor/moisture permeability.

Example 2

In Example 2, trilayered co-extruded water-proof and moisture-permeable film structure was fabricated by blown method. The top and bottom skin films were LLDPE with a thickness of 20 μm (118 W, commercial available from Saudi Basic Industries Corporation). The core layer was polyurethane with a thickness of 20 μm (ESTANE®58245, commercial available from Noveon). The blow-up ratio was 2.0. Before measuring the water permeability of the film, the top and bottom skin films were stripped off. Therefore, only ESTANE®58245 film was tested by ASTM-E96-BW and JIS-L-1099-A-2 as tabulated in Table 1.

Example 3

In Example 3, trilayered co-extruded water-proof and moisture-permeable film structure was fabricated by blown method. The top and bottom skin films were LDPE with a thickness of 20 μm (NA112-27, commercial available from USI corporation, Taiwan). The core layer was polyurethane with a thickness of 15 μm (ESTANE®58245, commercial available from Noveon). The blow-up ratio was 2.0. Before measuring the water permeability of the film, the top and bottom skin films were stripped off. Therefore, only ESTANE®58245 film was tested by ASTM-E96-BW and JIS-L-1099-A-2 as tabulated in Table 1.

Comparative Example

In Comparative Example, the thermoplastic polyurethane films such as DINTEX®FS2090, DINTEX®FT1681, and DINTEX®FT1880 (commercial available from DING ZING Chemical Product Co., Ltd., Taiwan) and porous polytetrafluroethylene (PTFE) film such as YEUMIFLON® STYLE 2101 (commercial available from YEU MING TAI CHEMICAL INDUSTRIAL CO., LTD., Taiwan) were tested by ASTM-E96-BW and JIS-L-1099-A-2. The water vapor permeability of the films was tabulated in Table 1.

As shown in Table 1, the polyurethane films of the invention have outstanding water permeability as a commercial product.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A co-extruded water-proof and moisture-permeable film structure, comprising:
   a top skin layer comprising first polyurethane;
   a core layer comprising second polyurethane; and
   a bottom skin layer comprising third polyurethane;
   wherein the core layer is disposed between the top skin layer and the bottom skin layer;
   the first and third polyurethane have lower moisture and vapor permeability than the second polyurethane; and
   the first, second, and third polyurethane are thermoplastic polyurethane comprising a hard segment and a soft segment.

2. The film structure as claimed in claim 1, wherein the hard segment comprises aromatic polyisocyanate.

3. The film structure as claimed in claim 2, wherein the aromatic polyisocyanate comprises 4,4-methylene bisphenyl diisocyanate or toluene diisocyanate.

4. The film structure as claimed in claim 1, wherein the soft segment comprises polyether-polyol, polyester-polyol, or copolymers thereof.

5. The film structure as claimed in claim 4, wherein the polyether-polyol comprises polyethylene glycol, polypropylene glycol, polytetramethylene glycol, or poly(1,4-butylene diol).

6. The film structure as claimed in claim 4, wherein the polyester-polyol comprises poly(1,4-butylene adipate).

7. The film structure as claimed in claim 1, wherein the hard segment and the soft segment have a molar ratio of 0.3 to 0.8.

8. The film structure as claimed in claim 1, wherein the top skin layer and the core layer have a thickness ratio of about 1/10 to 1/20.

TABLE 1

| | Commercial available polyurethane film | | | The polyurethane film of the invention | | | PTFE film |
|---|---|---|---|---|---|---|---|
| Sample | DINTEX® FS2090 | DINTEX® FT1681 | DINTEX® FT1880 | I-80M (Example 1) | ESTANE® 58237 (Example 2) | ESTANE® 58237 (Example 3) | YEUNIFLON® STYLE 2101 |
| Thickness | 15 μm | 17 μm | 21 μm | 20 μm | 20 μm | 15 μm | 15 μm |
| Water vapor permeability under ASTM-E96-BW | 700 | >10000 | >100000 | >10000 | >10000 | >10000 | 4900 |
| Water vapor permeability under JIS-L-1099-A-2 | 300 | 2600 | 3000 | 2700 | 1850 | 2500 | 3700 |

9. The film structure as claimed in claim 1, wherein the bottom skin layer and the core layer have a thickness ratio of about 1/10 to 1/20.

10. The film structure as claimed in claim 1 is fabricated by co-extrusion blown film or co-extrusion casting film.

11. A water-proof and moisture-permeable textile, comprising:
   a fabric; and
   the film structure as claimed in claim 1 laminated onto the fabric with an adhesive.

12. The textile as claimed in claim 11, wherein the fabric is woven, knitted, or non-woven.

13. The textile as claimed in claim 11, wherein the adhesive exhibits a non-continuous distribution.

14. The textile as claimed in claim 11 is applied in clothes, the automobile industry, medical articles, sport articles, bedding, or the glass industry.

* * * * *